Sept. 10, 1929.  W. H. THOMPSON  1,727,526
DUSTING MACHINE
Filed Dec. 27, 1928  2 Sheets-Sheet 1
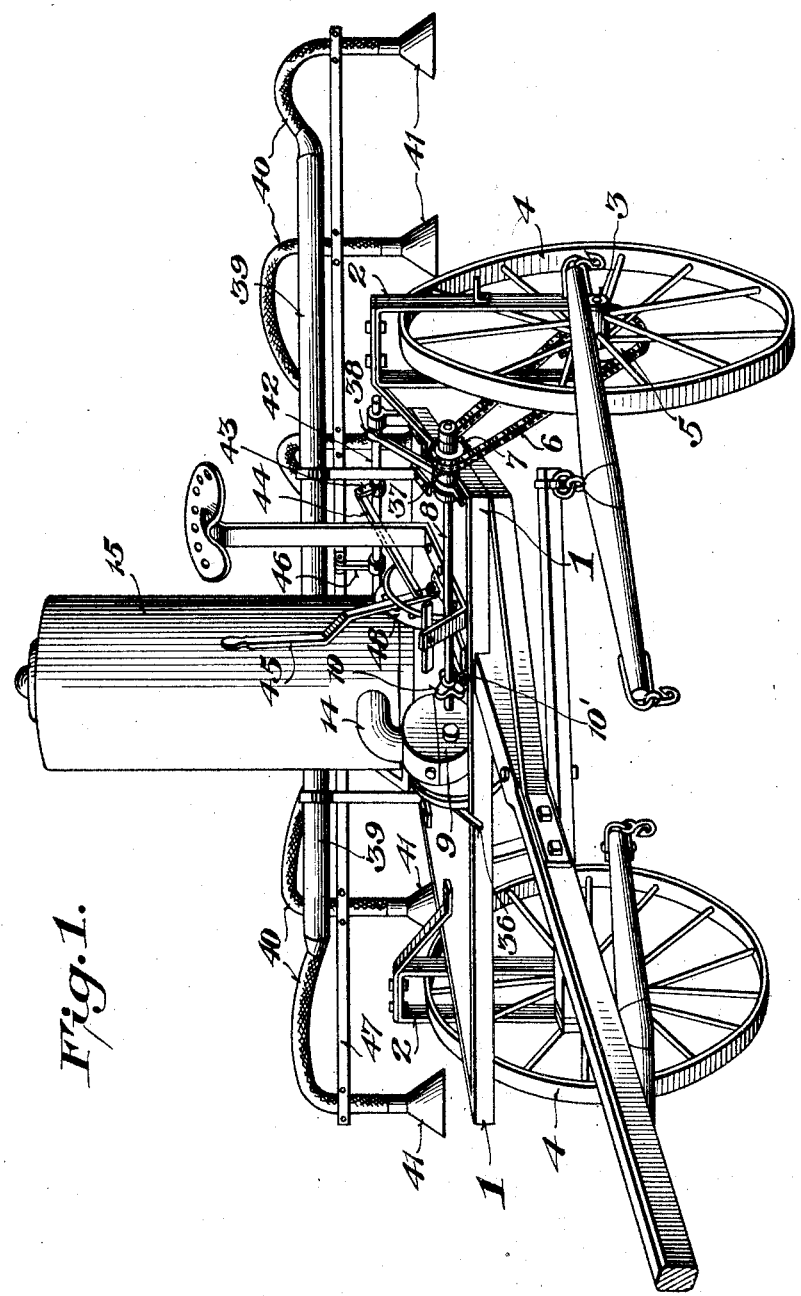
Fig.1.
INVENTOR
William H. Thompson,
BY 
ATTORNEY Sept. 10, 1929.     W. H. THOMPSON      1,727,526
DUSTING MACHINE
Filed Dec. 27, 1928      2 Sheets-Sheet 2
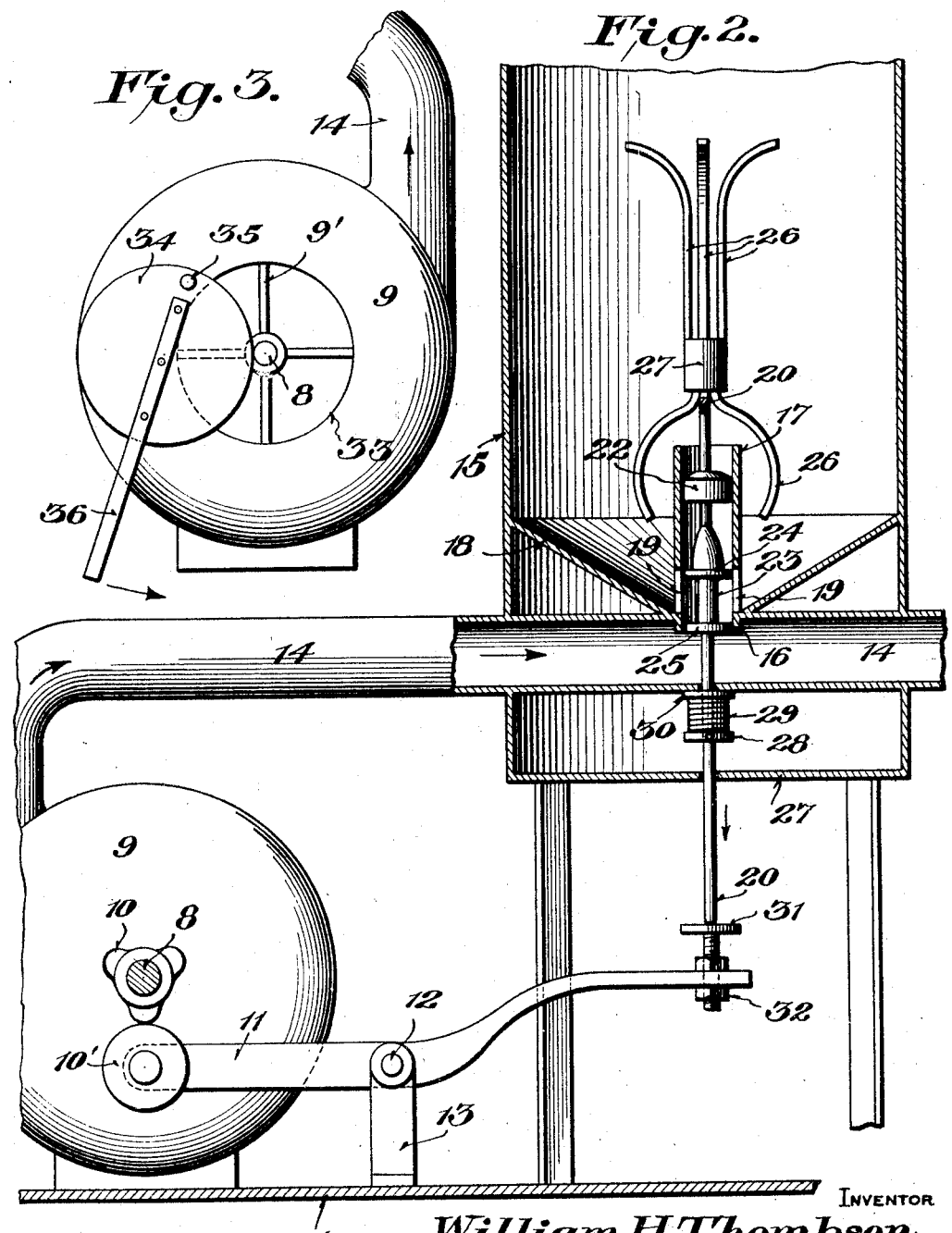

Patented Sept. 10, 1929.

1,727,526

UNITED STATES PATENT OFFICE.

WILLIAM H. THOMPSON, OF WICHITA FALLS, TEXAS, ASSIGNOR OF ONE-HALF TO J. W. DUNCAN, OF WICHITA FALLS, TEXAS.

DUSTING MACHINE.

Application filed December 27, 1928. Serial No. 328,767.

This invention relates to insect exterminating machines, and the primary object thereof is to provide a novel type of machine which exterminates the insects through dusting of a chemical on the plant, such as cotton or other plants.

A further object of the invention is to provide a novel manner of feeding the powdered chemical to the distributing means.

The invention further aims to provide a machine of this type which is of simple and economical construction, and one wherein the machine can be operated by a single operator, and in which the material is uniformly distributed and wherein the amount of material distributed can be easily and quickly controlled.

With the above and other objects in view, the invention resides in the novel construction and combination of elements to be now set forth.

In the drawings:—

Fig. 1 is a perspective view of the invention;

Fig. 2 is an enlarged vertical sectional view of the feeding means, and

Fig. 3 is an end view of the blower and its air supply control.

In proceeding in accordance with the present inventon, a frame is employed which has a platform 1 to which brackets 2 are secured, the latter having the axles 3 of the traction wheels 4 journaled therein. A pinion 5 is mounted on one of the axles and has a sprocket chain 6 trained thereover, the chain being also trained over a pinion or sprocket wheel 7 mounted on a shaft 8, the latter being journaled on the bed or platform 1. The shaft 8 is connected to the rotating piston 9' of a blower 9. The blower 9 is mounted on the platform 1 and the shaft 8 is equipped with a substantially three-sided cam 10.

The cam, as particularly shown in Fig. 2 of the drawings, is adapted to engage a roller 10' mounted on one end of an oscillating lever 11. The lever 11 is pivoted intermediate its ends at 12 to a bracket 13 which latter is mounted on the bed 1.

The outlet side of the blower has a conduit 14 connected thereto, the latter extending through a hopper or powder container 15, the container being suitably supported on the bed 1. By reference to Fig. 2, it will be seen that the conduit 14 passes completely through the container 15 diametrically thereof. The conduit is formed with an opening 16 from which a valve casing 17 projects upwardly above the conical bottom 18 of the hopper 15. The valve casing is formed with openings 19 which are located above the bottom 18 of the hopper. A vertical rod 20 is disposed within the valve casing and is provided with a disk-like guide 22 which latter slides within the valve casing 17. The rod 20 further has affixed thereto a spool shaped valve 23, the top and bottom disks 24 and 25 of which slidably fit within the valve casing 17. The rod 20 is provided at its upper end with agitator fingers 26 secured to the rod at 27, the fingers 26 being preferably formed of wire or like material so that upon reciprocation of the rod, same will be vibrated and thus increase the agitating effect thereof. The rod 20 passes through the conduit and through the bottom wall 27 of the container and has a collar 28 affixed thereto, the latter in turn being engaged by one end of a coil spring 29, the opposite end of which spring engages against a washer 30 mounted on the rod 20 and held by the spring against the under side of the conduit 14. The lower end of the rod 20 freely seats upon a disk 31 carried by an adjustable bolt 32, the bolt being secured to the opposite end of the lever 11.

As shown in Fig. 3 of the drawings, the inlet 33 of the blower is controlled by a disk valve 34 pivoted at 35 and having an operating handle 36 so that the amount of air entering the blower can be controlled.

A clutch 37 having an operating arm 38 is provided in the shaft 8 so as to control the operation of the latter.

The opposite or outlet end of the conduit 14 is connected to a horizontal distributing pipe 39, the latter having flexible hose connections 40, to the lower ends of which latter distributing nozzles 41 are secured. A shaft 42 is journaled on the bed 1 and has a crank arm 43 connected thereto, the arm 43 being connected by a link 44 to a hand lever 45. A crank arm 46 is mounted on the shaft 42 and is pivoted to a bar 47 which latter is connected to intermediate portions of each of the flexible hose connections 40. The usual segmental rack 48 is provided to hold the hand lever 45 in its adjusted position.

In operation, by manipulation of the lever 45 the operator can raise or lower the bar 47 and therethrough the nozzles 41 so as to dispose the latter in accordance with the height of the plants to be treated, whereupon the clutch lever 38 is moved to render the shaft 8 operative, thereby causing the blower to become active and force air through the container 14 as shown in Fig. 2. At the same time, the cam 10 effects oscillation of the lever 11 and the latter causes reciprocation of the rod 20 and its value. The spring 29 normally holds the lower end of rod 20 engaged with the disk 31, and thus causes positive movement of the rod 20 in a downward direction. Upon downward movement of the rod 20 from the position shown in Fig. 2, the powder, which will have gravitated through openings 19 into the annular pocket of the spool valve formed by and between the ends 24 and 25 thereof, will be moved into the conduit 14.

Due to the current of the air passing through the conduit 14, the powder will be carried outwardly into the common distributing pipe 39 and from the latter conveyed into the hose connections 40 and the nozzles 41.

It will further be seen that when the valve is in its lowermost position, its top end 24 will close the opening 16 and prevent entry of the air into the hopper.

From the foregoing, it will be seen that the rod 20 is constantly reciprocated and is given a rapid up and down movement, and that the material is fed into the conduit 14 from the hopper in predetermined quantities and at intervals dependent upon the speed of rotation of the shaft 8. By adjusting the bolt 32 and therethrough the disk 31 carried thereby, it will be seen that the extent of movement of the spool 23 can be controlled and thereby regulation of the amount of material fed into the container 14. The length of the stroke of the rod 20 can be thus adjusted to feed a larger or smaller amount of powder into the conduit.

What is claimed is:—

1. In a machine of the type set forth, a container having a lateral conduit extending therethrough, means to supply air under pressure to one end of the conduit, a vertical tubular element connected to the conduit and having an opening communicating with the conduit to convey material from the container into the conduit, a spring pressed reciprocal rod in said element having a spool-shaped valve thereon controlling the feed of the material through said opening of the element, a horizontally pivoted lever, cam means engageable with one end of the lever to oscillate same, an abutment on the opposite end of the lever engaging the lower end of the rod, said abutment being adjustable so as to vary the extent of movement of the rod and thereby of the valve to vary the amount of material entering the conduit, and distributing means connected to the opposite end of the conduit.

2. In a machine of the type set forth, a container having a lateral conduit extending therethrough, means to supply air under pressure to one end of the conduit, a vertical tubular element connected to the conduit and having an opening communicating with the conduit to convey material from the container into the conduit, a spring pressed reciprocal rod in said element having a spool-shaped valve thereon controlling the feed of the material through said opening of the element, a horizontal pivoted lever engageable with the lower end of the rod, means to oscillate the lever to thereby reciprocate the rod, and distributing means connected to the opposite end of the conduit.

3. In a machine of the type set forth, a container having a lateral conduit extending therethrough, means to supply air under pressure to one end of the conduit, a vertical tubular element connected to the conduit and having an opening communicating with the conduit to convey material from the container into the conduit, a spring pressed reciprocal rod in said element having a spool-shaped valve thereon controlling the feed of the material through said opening of the element, means to reciprocate the rod, and distributing means connected to the opposite end of the conduit.

4. In a machine of the type set forth, a container having a lateral conduit, means to supply air under pressure to the conduit, a valve casing communicating with the container and with the conduit, a spool-shaped valve slidable in the casing to control the feed of the material from the container into the conduit, means to reciprocate the rod, and material distributing means connected to the conduit.

5. In a machine of the type set forth, a container having a conduit extending therethrough and communicating therewith, a blower having a shaft, a reciprocal spring pressed valve controlling the communication between the container and the conduit, a rod connected to the valve, a lever engaging the rod, and a cam on the blower shaft for operating the lever.

6. In a machine of the type set forth, a container having a lateral conduit extending therethrough, means to supply air under pressure to the conduit, a tubular element in the container communicating with the conduit and having an inlet to receive material from the container, a reciprocal rod in the element, means on the rod below said inlet and operable within said element to receive and support the material entering the element, means on the rod spaced from said first named means on the rod and disposed above the lower end of said inlet and formed to cut off said inlet from the conduit and from the air passing through the conduit upon downward movement of the rod, and means to reciprocate the rod.

7. In a machine of the type set forth a container having a lateral conduit communicating with the container and extending therethrough, means to supply air under pressure to the conduit, a reciprocal rod in the container, extending transversely through the conduit and below the container, means on the rod to control the feed of the material from the container into the conduit, spring means for normally urging the rod downwardly, and means to reciprocate the rod.

In testimony whereof I affix my signature.

WILLIAM H. THOMPSON.